United States Patent Office 2,716,084
Patented Aug. 23, 1955

2,716,084

PRODUCTION OF ENDODEXTRANASE BY ASPERGILLUS WENTII

Virginia Whiteside Carlson and Warner W. Carlson, Birmingham, Ala., assignors to The Commonwealth Engineering Company of Ohio, Dayton, Ohio, a corporation of Ohio No Drawing. Application December 1, 1953, Serial No. 395,582

13 Claims. (Cl. 195—66)

In our pending applications Serial Nos. 232,864, filed June 21, 1951, and 241,168, filed August 9, 1951, we have disclosed that when molds of the genus Aspergilli are cultivated on media containing inorganic salts and an acclimating amount of dextran, the enzyme obtained is a "limit" endo-dextranase which is a hydrolytic agent for dextran, attacking the glucosidic linkages of large dextran molecules to split them into segments of substantially uniform and predeterminable size between the initial size of the large molecule and a smaller size corresponding to a molecular weight not substantially lower than 20,000, beyond which limit the endo-dextranase has little further splitting effect on the dextran. This is an extremely important discovery because, by correlating the conditions under which the endodextranase is allowed to act on the large dextrane molecules, such as those of so-called "native" dextran obtained by enzyme synthesis of dextran from sucrose in the presence or substantial absence of bacteria and cellular debris, it is possible to obtain dextran segments or fractions of substantially equal size and molecular weight above 20,000, which fractions are true homologs of the parent dextran polymer in that the dependent groups are retained intact. It is thus possible to obtain a "clinical" dextran for intravenous injection without resorting to acid hydrolysis of the native or high molecular weight dextran and the disadvantages which attend it. As is known, acid attacks the large dextran molecules in an indiscriminate manner, to split it into non-uniform fractions or segments having a wide range of molecular weights and also cleaves off dependent groups. The fractions or segments obtained by acid hydrolysis of native or high molecular weight dextran are not true homologs of the parent dextran polymer.

It is known, in enzymology, that, in cultivating molds to obtain an enzyme, the production of an enzyme having specific action on a given substrate can be favored by including an acclimating amount of the substrate to be subsequently acted on by the enzyme in the culture media for the mold. Not infrequently it happens that, if the mold is cultivated in a medium containing a substrate or carbon source different from the substance to be acted on subsequently by the enzyme, the enzyme will exhibit little if any action of the desired type on the latter substance. Thus, Hultin and Nordstrom report (Chemica Scandinavic 3, 1405–1417, 1949) that when they cultivated Penicillium and Verticillium molds in media containing dextran as C source, they obtained an enzyme, a dextranase, having the capacity to split dextran. They show (supra, p. 1411 etc.) that their dextranase attacked all linkages of the dextran with equal ease. They obtained, as the dextran cleavage products, reducing sugars and oligo-saccharides, the latter being products having a maximum molecular weight of 648, ($C_6H_{10}O_5$)$_4$O, i. e., low molecular weight products. However, these authors further report that when they cultivated their Penicillium and Verticillium molds in media containing starch as the sole C source (no dextran) they obtained an amylase effective on starch but having no splitting action on dextran. They conclude (supra, p. 1406) that amylase and dextranase are formed only adaptively by their molds.

We have shown in our pending applications above-identified, that the Aspergilli molds yield an enzyme or endo-dextranase which, as pointed out above, attacks glucosidic linkages of dextran to split it into segments or fractions made up of molecules of equal size and exhibits a preference for the linkages interiorly of the dextran molecule, i. e., it does not attack all linkages of the dextran with equal ease. The Aspergilli molds, therefore, yield an endo-dextranase which is different from dextranases of the prior art as represented by that from the Penicillium and Verticillium molds of Hultin and Nordstrom discussed above.

We find that the Aspergilli molds are also different in their behavior and environmental requirements. Whereas the presence of dextran, of which at least 50%, and generally more, of the molecular structural repeating linkages between the anhydroglucopyranosidic units are of the alpha-1,6 type, is required in the culture media for the Penicillia and Verticillia molds in order to obtain a dextranase, i. e., an enzyme capable of splitting the alpha-1,6 linkages of dextran, we find that the Aspergilli molds do not require dextran in the culture media for elaboration of our endo-dextranase. On the contrary, and surprisingly in view of the prior experience with other molds, the Aspergilli molds elaborate our endo-dextranase when cultivated in medium containing carbohydrates of varying molecular structural repeating alpha-1,6 to non-alpha-1,6 linkages ratios including dextran in which the proportion of the alpha-1,6 type linkages is high and carbohydrates in which the proportion of alpha-1,6 linkages is not high. Specifically, we find that the Aspergilli molds elaborate our endodextranase in culture media which contain dextran and also in media which contain no dextran but which do contain, instead, either starch or glycogen. The endo-dextranase elaborated by the Aspergilli molds in media containing appropriate inorganic salts, an amino acids source, and either starch or glycogen, but no dextran, in aqueous dilutions of from 1:10 to 1:100 attacks glucosidic linkages of large dextran molecules in the same manner as does the endo-dextranase elaborated by those molds in dextran-containing culture media, to split the large molecule into smaller segments or fractions having a substantially uniform molecular weight between the weight of the dextran split and a lower limit of about 20,000, and the size of which, in the range stated, can be predetermined by correlating the conditions under which the endo-dextranase acts on the dextran and stopping the action in any suitable way when the splitting has proceeded to the desired extent.

The nutrient media for cultivation of the Aspergilli may be an aqueous solution of metallic salts containing amino acids or a protein source of amino acids and the starch or glycogen, and may also contain supplements such as B-vitamins or yeast extract. The nutrient medium may advantageously be an aqueous composition having a total metallic salts content of between about 2.0 and 5.0 gms./liter of water, about 2.0 to about 6.0 gms./liter of peptone or an equivalent amount of amino acids or of an amino acid source other than peptone, e. g., protein hydrolyzates such as casein hydrolyzate, and from 5.0 gms. to about 50.0 gms. of either dextran, soluble starch or glycogen, per liter.

The pH value of the media may vary between 4.0 and 7.5, and for rapid elaboration of optimum amounts of the endo-dextranase, is preferably controlled and maintained in the range between neutrality and slightly on the alkaline side, i. e., between 7.0 and 7.5. The culture may be incubated at room temperature.

A typical medium in which the Aspergilli mold may be cultivated to obtain rapid elaboration of the dextranase has a composition as given below.

TYPICAL CULTURE MEDIUM

Carbohydrate-salts solution:

| Component: | Grams/liter |
|---|---|
| Peptone | 5.0 |
| MgSO$_4$ | 10.0 |
| NaCl | 0.1 |
| FeSO$_4$ | 0.1 |
| MnSO$_4$ | 0.01 |
| KH$_2$PO$_4$ | 0.01 |
| Sodium acetate | 0.1 |
| Potassium acetate | 2.0 |
| Dextran, starch or glycogen | 5.0 |

| B-vitamins: | Milligrams/liter |
|---|---|
| Nicotinic acid | 1.0 |
| Riboflavin | 1.0 |
| Thiamine | 0.5 |
| Ca pantothenate | 0.5 |
| Pyridoxine | 0.4 |
| Folic acid | 0.01 |
| Biotin | 0.001 |

Species of Aspergilli which may be cultivated in these media to obtain the endo-dextranase include *A. ustus, A. candidus, A. niger, A. tamaric, A. flavus-oryzal,* and *A. wentii.* At present, it is preferred to inoculate the culture media with a strain of *A. wentii.*

When the endo-dextranase has been elaborated, the culture may be filtered to remove the mold mat and obtain a filtrate containing the endo-dextranase, which filtrate may be used as such, or after suitable dilution with water for splitting dextran or for any other purpose to which the endo-dextranase is adapted, or the latter may be isolated from other substances present in the filtrate by selective solvent precipitation or by selective salting out. The isolated endo-dextranase may be introduced into a medium containing dextran to be split, or otherwise used as such or in the form of an aqueous dilution. As noted above, the endo-dextranase is effective in splitting dextran in aqueous medium in dilutions of 1:10 to 1:100 when the culture media for the mold contains soluble starch or glycogen and no dextran. The endo-dextranase elaborated in culture media containing an acclimating amount of the dextran which may be native or high molecular weight dextran (or a dextran of lower molecular weight) instead of the carbohydrates mentioned usually is more active and may be used in higher dilutions. Thus, the endo-dextranase elaborated by *Aspergillus wentii* in a dextran-containing culture medium as given herein typically splits native dextran synthesized from sucrose by the enzyme dextransucrase into fractions of regular, substantially uniform lower molecular weight very rapidly in dilutions of from 1:100 to 1:1000 in from one to five hours at room temperature, and may be used successfully in dilutions as high as 1:10,000 to 1:100,000 with somewhat longer reaction periods.

Various modifications may be made in the composition of the specific medium given. Thus (1) the B-vitamins may be omitted; (2) the B-vitamins may be replaced by yeast extract in an amount of, for example, 0.4 gm./liter; (3) the peptone may be replaced by casein hydrolyzate in an amount of about 5.0 gm./liter with or without inclusion of the B-vitamins; (4) a medium of the composition given in which any one of the carbohydrates listed is present in an amount of from 5.0 to 50.0 gms./liter.

The amounts of the various ingredients given are not strictly critical and may be varied somewhat, so long as the nutrition requirements of the mold are satisfied so that the mold flourishes.

The following examples will serve to illustrate the invention, it being understood that these examples are not limitative. The mold used in the examples was similar to the mold on file with the American Type Culture Collection, Washington, D. C., and designated *Aspergillus wentii* ATTC 1023.

Example I

The *Aspergillus wentii* was inoculated into a flask containing a medium having the composition tabulated above and containing 1.0% (about 5.0 gms.) of soluble starch. The inoculated medium was incubated at room temperature for about seven days, after which it was filtered to free it of the mold mat. The filtrate obtained contained the endo-dextranase.

Example II

The *Aspergillus wentii* was inoculated into a flask containing a medium having the composition tabulated above and containing 1.0% (about 5.0 gms.) of glycogen. The inoculated medium was incubated at room temperature for about seven days, after which it was filtered to free it of the mold mat. The filtrate obtained contained the endo-dextranase.

The endo-dextranase activity of the filtrate in splitting high molecular weight dextran was proved by observation of the progressive decrease in flow time (and calculation of the relative viscosity) of aqueous solutions containing the dextran to be split and the filtrate over a period of time.

Each filtrate was introduced into a separate No. 200 Fenske-Ostwald viscometer containing an aqueous 4.5% solution of native dextran having a molecular weight calculated to be in the millions. The results are shown in the table, below:

TABLE.—DECREASE IN FLOW TIME

| Time after Filtrate Addition | Dextran Filtrate Dilution of 1:100 | Starch Filtrate Dilution of 1:10 | Glycogen Filtrate Dilution of 1:10 |
|---|---|---|---|
| | Seconds | Seconds | Seconds |
| 0 minutes | 158.0 | 158.0 | 158.0 |
| 4 minutes | 126.5 | 122.6 | 112.4 |
| 10 minutes | 94.4 | 92.7 | 77.2 |
| 20 minutes | 70.4 | 70.0 | 55.9 |
| 30 minutes | 59.0 | 56.0 | 45.2 |
| 40 minutes | 50.0 | 47.2 | 38.8 |
| 60 minutes | 40.2 | 38.8 | 32.2 |
| 80 minutes | 35.8 | 34.5 | 30.5 |
| 100 minutes | 33.5 | 32.3 | 29.4 |
| 120 minutes | 31.4 | 30.4 | 28.4 |
| 140 minutes | 30.1 | 29.5 | 28.0 |
| 30 hours | 24.2 | 24.5 | 23.9 |

NOTE:—The H$_2$O time of the viscometer was 14.0 seconds. The relative viscosity for each time interval is obtained by dividing each of the flow-time values by 14.0.

The progressive decrease in flow time (and in relative viscosity) of the solution with time of action of the endo-dextranase on the dextran being split is evidence that the endo-dextranase attacked the alpha- 1,6 linkages of the large dextran molecules of the native dextran, to split them into smaller segments or fractions. As will be observed, the filtrates obtained from the culture containing soluble starch or glycogen compared very favorably as to the dextran-splitting capacity thereof with the filtrate from the culture containing dextran. The comparison with the filtrate from the starch-containing medium is particularly striking in view of the literature reports that cultivation of other classes of molds in starch-containing media did not result in a dextranase or enzyme capable of splitting glucosidic linkages of dextran. Unlike the dextranase from the prior art molds referred to above, our endo-dextranase is not formed only adaptively.

It will be understood that the media for the cultivation of the Aspergilli molds and the conditions of the cultivation may be varied, and that either the filtrate, the endo-dextranase isolated therefrom, or an aqueous dilution of the filtrate or of the precipitated endo-dextranase may be introduced into an aqueous medium containing any appropriate concentration of dextran to be split, such as a 4% to 10% solution. Since these and other obvious variations and modifications may be made in the specific details given, in practicing the invention, without departing from the spirit and scope of the invention, it will be understood that the invention is not intended to be limited except as defined in the appended claims.

What is claimed is:

1. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous composition containing dissolved metallic salts and, per liter of water, from about 2.0 gms. to about 6.0 gms. of a substance selected from the group consisting of amino acids and protein sources of amino acids, and from about 5.0 gms. to about 50.0 gms. of, as sole carbohydrate, a substance selected from the group consisting of starch and glycogen, incubating the culture until the endo-dextranase is elaborated therein, and filtering the culture to remove the mold mat and leave a filtrate containing the endo-dextranase.

2. The method according to claim 1, characterized in that the amino acids source in the nutrient medium is peptone.

3. The method according to claim 1, characterized in that the carbohydrate in the nutrient medium is starch.

4. The method according to claim 1, characterized in that the carbohydrate in the nutrient medium is glycogen.

5. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous solution of dissolved metallic salts containing B-vitamins, a protein source of amino acids and, as sole carbohydrate, a substance selected from the group consisting of starch and glycogen, incubating the culture until the endo-dextranase is elaborated therein, and filtering the culture to remove the mold mat and leave a filtrate containing the endo-dextranase.

6. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous solution of dissolved metallic salts containing yeast extract, peptone, and, as sole carbohydrate, a substance selected from the group consisting of starch and glycogen, incubating the culture until the endo-dextranase is elaborated therein, and filtering the culture to remove the mold mat and leave a filtrate containing the endo-dextranase.

7. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous solution of dissolved metallic salts containing B-vitamins, casein hydrolyzate and, as sole carbohydrate, a substance selected from the group consisting of starch and glycogen, incubating the culture until the endo-dextranase is elaborated therein, and filtering the culture to remove the mold mat and leave a filtrate containing the endo-dextranase.

8. The method of obtaining a filtrate containing endo-dextranase having the capacity to attack glucosidic linkages of large dextran molecules to thereby split the large molecules into relatively low molecular weight segments, which comprises inoculating an *Aspergillus wentii* into a nutrient medium comprising an aqueous solution of dissolved metallic salts containing B-vitamins, peptone and, as sole carbohydrate, a substance selected from the group consisting of starch and glycogen, incubating the culture until the endo-dextranase is elaborated therein, and filtering the culture to remove the mold mat and leave a filtrate containing the endo-dextranase.

9. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous composition containing the following constituents—

Carbohydrate-salts solution:

| Component: | Grams/liter |
|---|---|
| Peptone | 5.0 |
| MgSO$_4$ | 10.0 |
| NaCl | 0.1 |
| FeSO$_4$ | 0.1 |
| MnSO$_4$ | 0.01 |
| KH$_2$PO$_4$ | 0.01 |
| Sodium acetate | 0.1 |
| Potassium acetate | 2.0 |
| Starch | 5.0 |

B-vitamins:

| | Milligrams/liter |
|---|---|
| Nicotinic acid | 1.0 |
| Riboflavin | 1.0 |
| Thiamine | 0.5 |
| Ca pantothenate | 0.5 |
| Pyridoxine | 0.4 |
| Folic acid | 0.01 |
| Biotin | 0.001 | incubating the culture until the endo-dextranase is elaborated therein, and filtering the culture to remove the mold mat and leave a filtrate containing the endo-dextranase.

10. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous composition containing the following constituents—

Carbohydrate-salts solution:

| Component: | Grams/liter |
|---|---|
| Peptone | 5.0 |
| MgSO$_4$ | 10.0 |
| NaCl | 0.1 |
| FeSO$_4$ | 0.1 |
| MnSO$_4$ | 0.01 |
| KH$_2$PO$_4$ | 0.01 |
| Sodium acetate | 0.1 |
| Potassium acetate | 2.0 |
| Glycogen | 5.0 |

B-vitamins:

| | Milligrams/liter |
|---|---|
| Nicotinic acid | 1.0 |
| Riboflavin | 1.0 |
| Thiamine | 0.5 |
| Ca pantothenate | 0.5 |
| Pyridoxine | 0.4 |
| Folic acid | 0.01 |
| Biotin | 0.001 | incubating the culture until the endo-dextranase is elaborated therein, and filtering the culture to remove the mold mat and leave a filtrate containing the endo-dextranase.

11. The method of obtaining a filtrate containing endo-dextranase having the capacity to attack glucosidic linkages of large dextran molecules to thereby split the large molecules into relatively low molecular weight segments, which comprises inoculating *Aspergillus wentii* into a nutrient medium comprising an aqueous metallic salt solution containing a substance selected from the group consisting of amino acids and protein sources of amino acids and as sole carbohydrate a substance selected from the group consisting of starch and glycogen, incubating the culture until the endo-dextranase is elaborated therein, and filtering the culture to remove the mold mat and leave a filtrate containing the endo-dextranase.

12. The method of claim 11 in which the sole carbohydrate constituent of the medium is starch.

13. The method of claim 11 in which the sole carbohydrate constituent of the medium is glycogen.

References Cited in the file of this patent

UNITED STATES PATENTS

| | | |
|---|---|---|
| 2,482,055 | Duggar | Sept. 13, 1949 |
| 2,597,019 | Moyer | May 20, 1952 |

OTHER REFERENCES

Stokes et al., Jour. Bacteriology, March 1944, pages 293 through 299.